United States Patent
Skinner

(10) Patent No.: US 10,485,222 B2
(45) Date of Patent: Nov. 26, 2019

(54) ANIMAL TETHERING ASSEMBLY

(71) Applicant: Kyle Skinner, Allenhust, GA (US)

(72) Inventor: Kyle Skinner, Allenhust, GA (US)

( * ) Notice: Subject to any disclaimer, the term of this patent is extended or adjusted under 35 U.S.C. 154(b) by 537 days.

(21) Appl. No.: 15/286,307

(22) Filed: Oct. 5, 2016

(65) Prior Publication Data

US 2018/0092333 A1   Apr. 5, 2018

(51) Int. Cl.
  *A01K 1/04*   (2006.01)
  *A01K 27/00*   (2006.01)

(52) U.S. Cl.
  CPC .............. *A01K 27/004* (2013.01); *A01K 1/04* (2013.01); *A01K 27/005* (2013.01)

(58) Field of Classification Search
  CPC ......... A01K 27/004; A01K 27/00; A01K 1/04
  See application file for complete search history.

(56) References Cited

U.S. PATENT DOCUMENTS

| | | | |
|---|---|---|---|
| 184,663 A * | 11/1876 | Reichert | A01K 1/04 |
| | | | 242/379.2 |
| 224,083 A * | 2/1880 | Furman | A01K 1/04 |
| | | | 119/790 |
| 364,175 A * | 5/1887 | Hurd | A01K 1/04 |
| | | | 119/790 |
| 458,938 A * | 9/1891 | Bloomfield | G01B 3/1041 |
| | | | 242/375 |
| 745,808 A * | 12/1903 | Fair, Jr. et al. | A01K 1/04 |
| | | | 119/789 |
| 843,954 A * | 2/1907 | Long | A01K 1/04 |
| | | | 119/790 |
| 883,782 A * | 4/1908 | Butcher | A01K 1/04 |
| | | | 119/790 |
| 1,774,439 A * | 8/1930 | Holtson | F16J 13/02 |
| | | | 116/306 |
| 2,172,043 A * | 9/1939 | Wolf | G01B 3/1005 |
| | | | 242/379 |
| 2,424,368 A * | 7/1947 | Oberdorf | A01K 1/04 |
| | | | 119/789 |
| 2,725,853 A * | 12/1955 | Nordheim | A47D 13/086 |
| | | | 119/789 |
| 3,123,052 A | 3/1964 | Marshall | |
| 3,637,159 A * | 1/1972 | Caramella | F21V 21/18 |
| | | | 242/379.2 |
| 4,796,566 A | 1/1989 | Daniels | |
| 4,901,938 A * | 2/1990 | Cantley | B65H 75/44 |
| | | | 242/378.1 |
| D398,085 S | 9/1998 | Gallo | |
| 6,435,137 B1 | 8/2002 | Hourihan | |
| 7,337,638 B1 | 3/2008 | Tierney | |
| 7,493,873 B2 * | 2/2009 | Petersen | A01K 1/04 |
| | | | 119/789 |
| 7,673,588 B2 | 3/2010 | Head | |

(Continued)

FOREIGN PATENT DOCUMENTS

WO   WO0228170   4/2002

*Primary Examiner* — Son T Nguyen

(57) ABSTRACT

An animal tethering assembly includes an anchor that may be inserted into ground. A leash unit is removably coupled to the anchor. The leash unit includes a leash that may be attached to an animal thereby restricting movement of the animal. The leash is selectively urged outwardly from the leash unit. Moreover, the leash is selectively retracted into the leash unit.

10 Claims, 5 Drawing Sheets

(56) References Cited

U.S. PATENT DOCUMENTS

| | | | |
|---|---|---|---|
| 2005/0262816 A1* | 12/2005 | Peterson | A01K 1/04 |
| | | | 54/34 |
| 2007/0215064 A1 | 9/2007 | Petersen | |
| 2008/0072845 A1* | 3/2008 | Head | A01K 1/04 |
| | | | 119/789 |
| 2010/0148028 A1* | 6/2010 | Hand | A47F 5/0892 |
| | | | 248/330.1 |

* cited by examiner

ANIMAL TETHERING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention
(2) Description of Related Art Including Information Disclosed Under 37 CFR 1.97 and 1.98

The disclosure and prior art relates to tethering devices and more particularly pertains to a new tethering device for selectively dispensing and retracting a leash on an animal.

BRIEF SUMMARY OF THE INVENTION

An embodiment of the disclosure meets the needs presented above by generally comprising an anchor that may be inserted into ground. A leash unit is removably coupled to the anchor. The leash unit includes a leash that may be attached to an animal thereby restricting movement of the animal. The leash is selectively urged outwardly from the leash unit. Moreover, the leash is selectively retracted into the leash unit.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
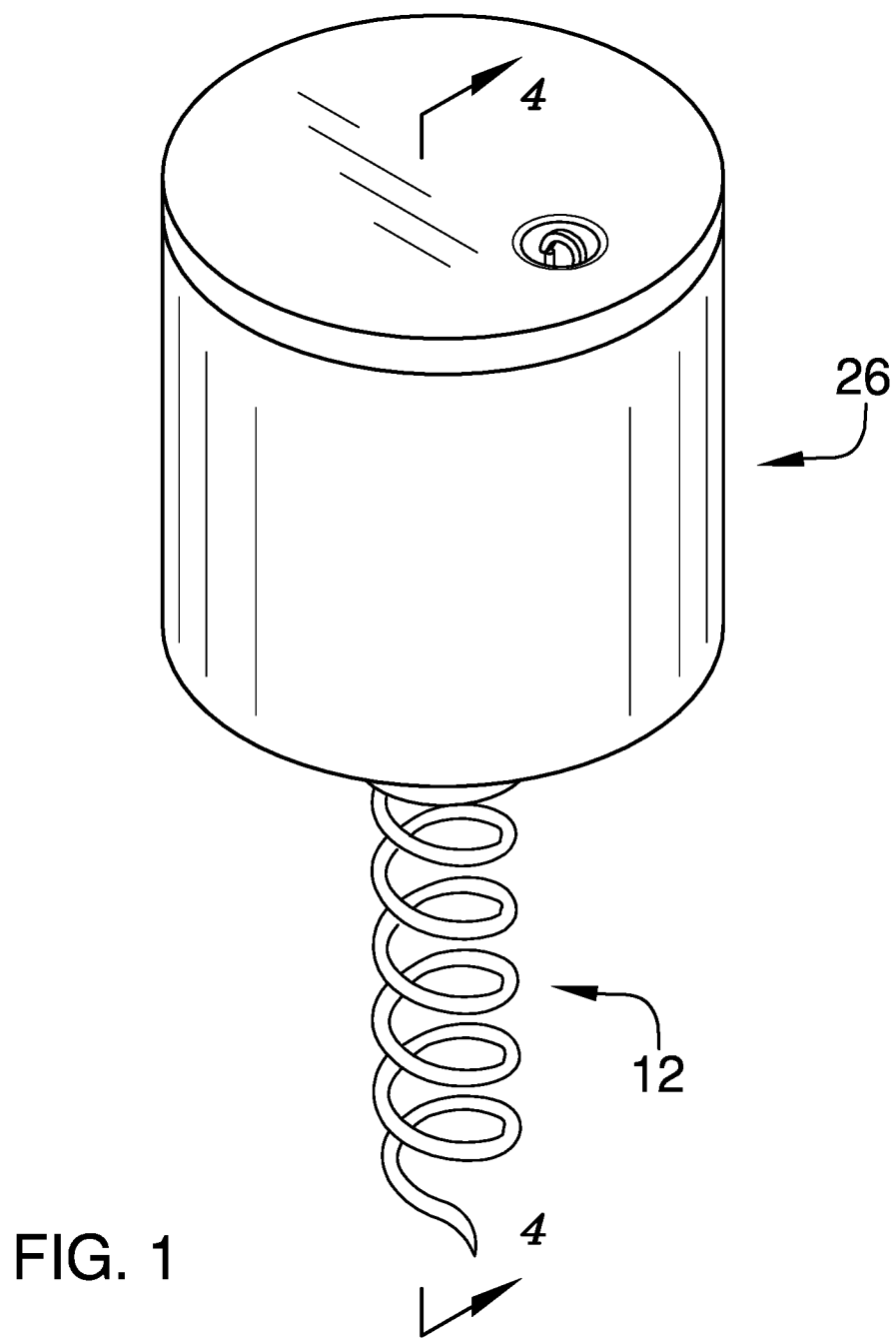
FIG. 1 is a top perspective view of an animal tethering assembly according to an embodiment of the disclosure.
Figure 2:
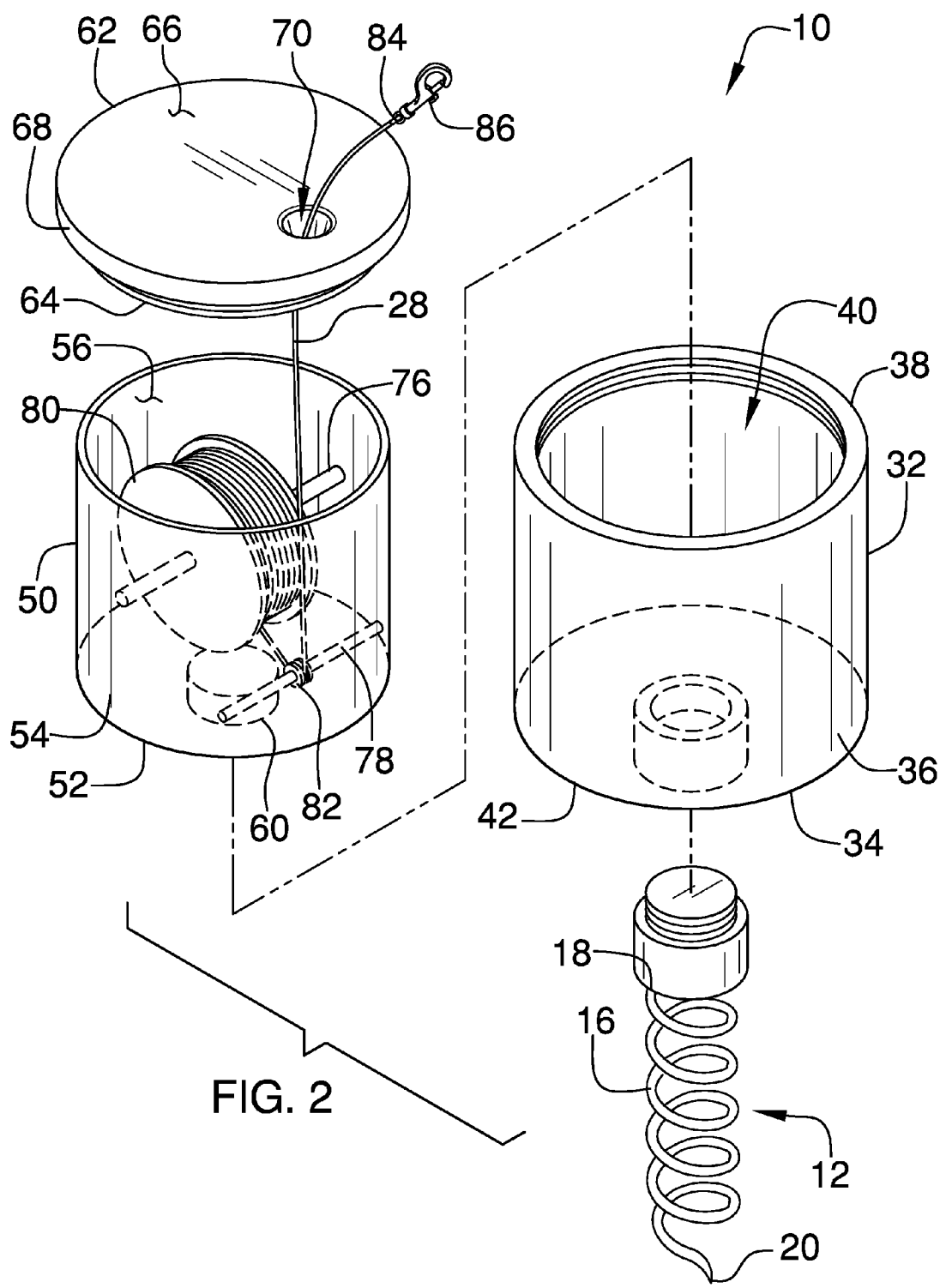
FIG. 2 is an exploded perspective view of an embodiment of the disclosure.
Figure 3:
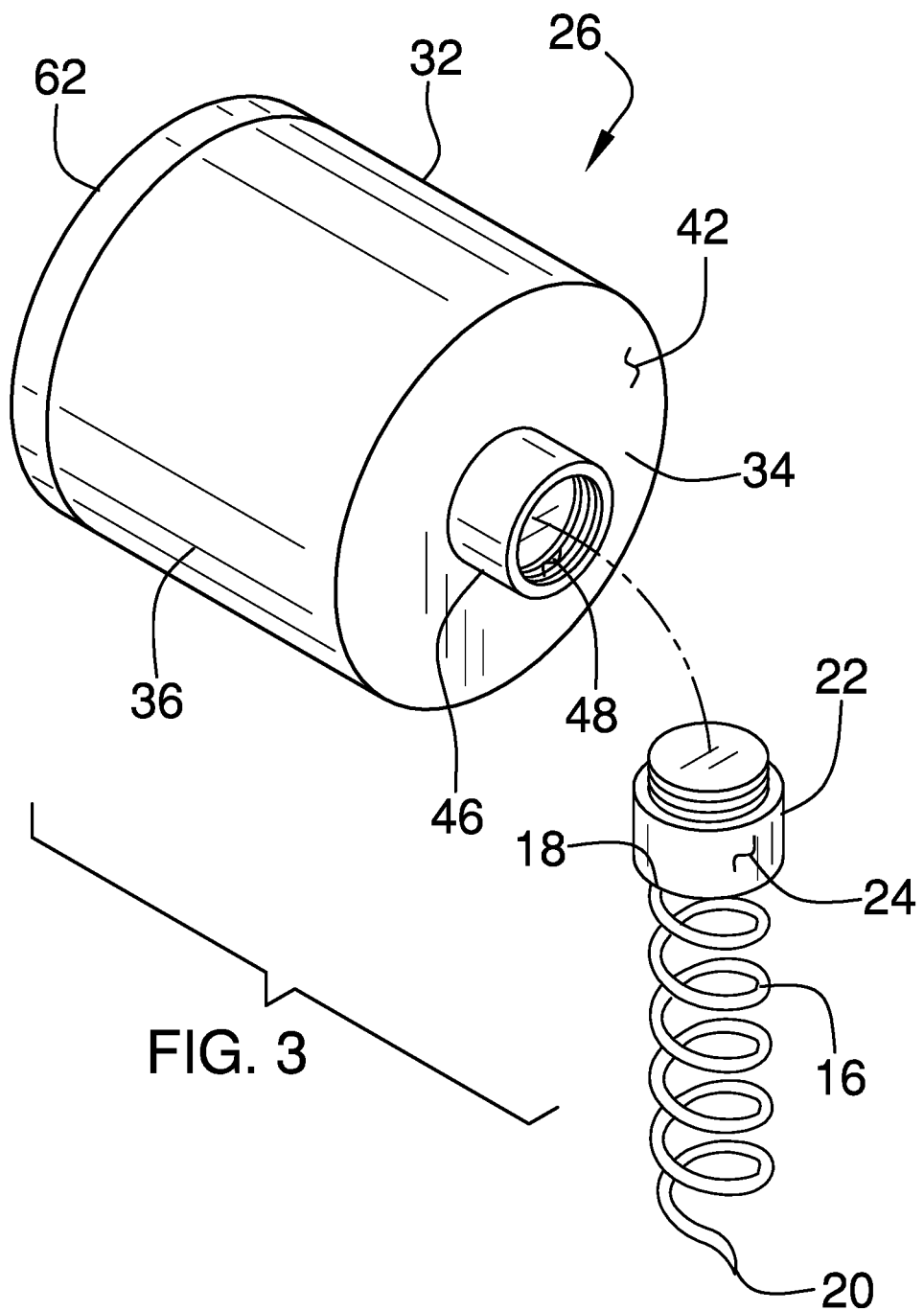
FIG. 3 is a perspective view of an embodiment of the disclosure.
Figure 4:
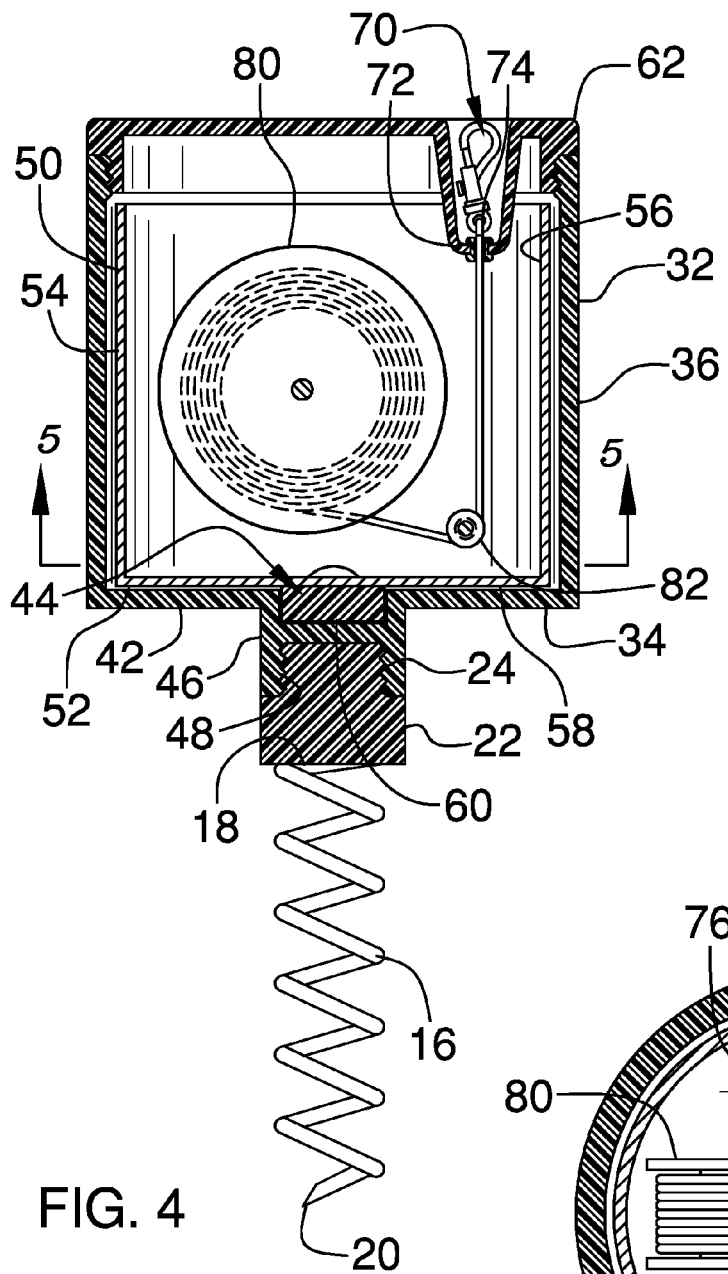
FIG. 4 is a cross sectional view taken along line 4-4 of FIG. 1 of an embodiment of the disclosure.
Figure 5:
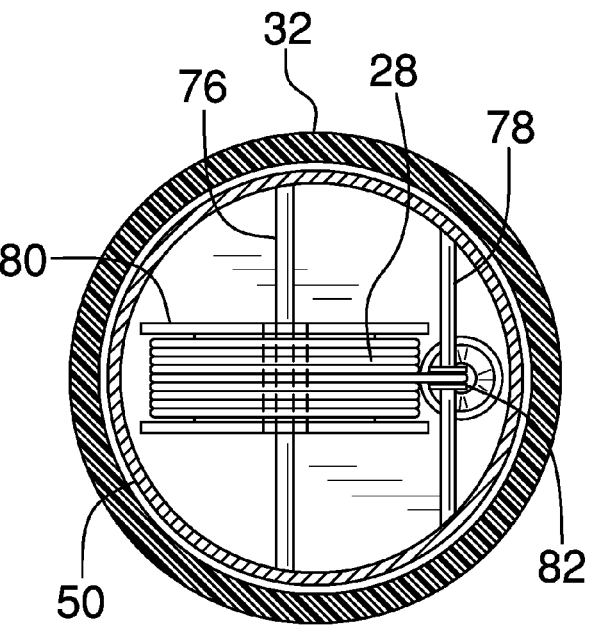
FIG. 5 is a cross sectional view taken along line 5-5 of FIG. 4 of an embodiment of the disclosure.
Figure 6:
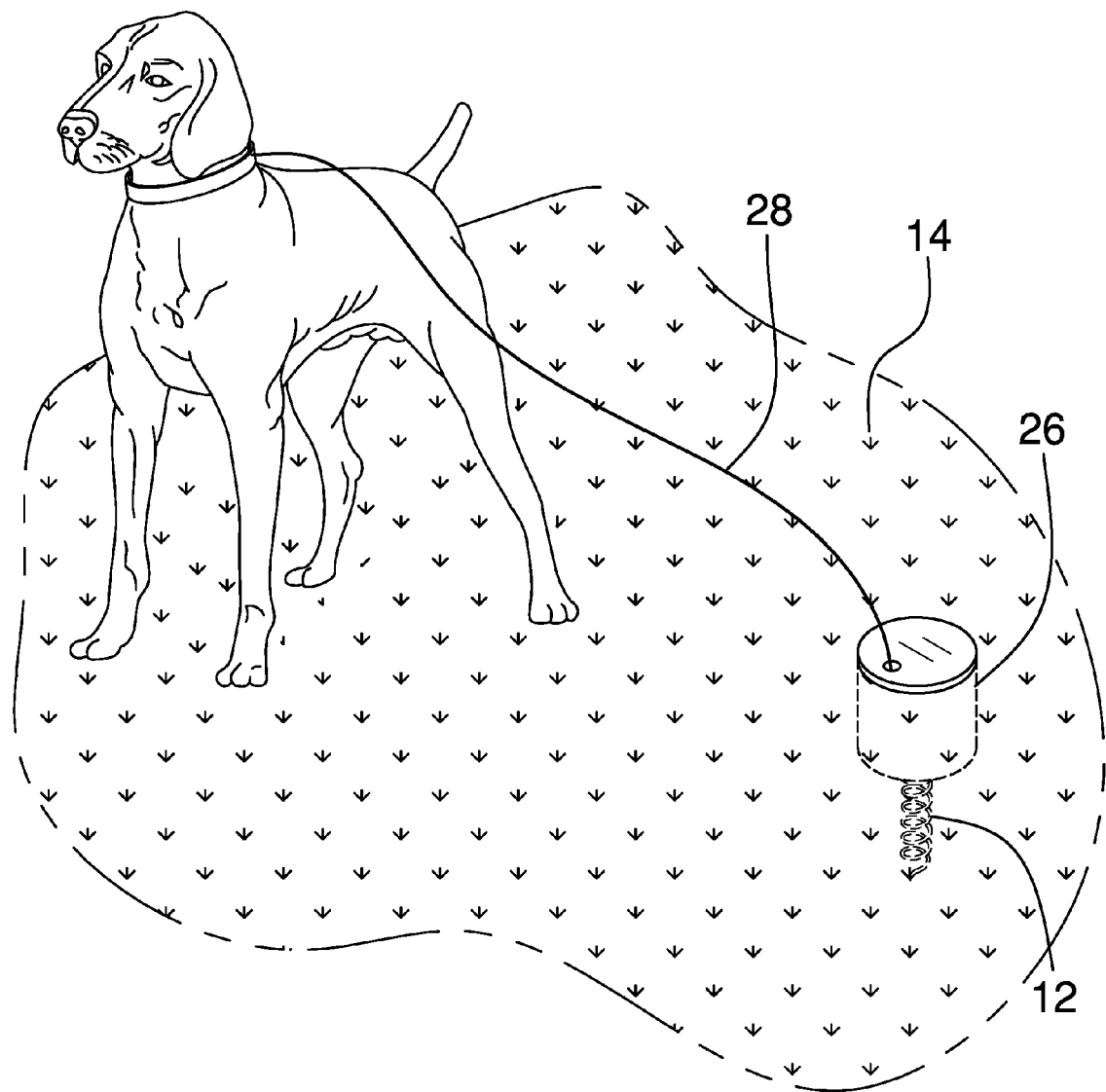
FIG. 6 is an in-use perspective view of an embodiment of the disclosure.

With reference now to the drawings, and in particular to FIGS. 1 through 6 thereof, a new tethering device embodying the principles and concepts of an embodiment of the disclosure and generally designated by the reference numeral 10 will be described.

As best illustrated in FIGS. 1 through 6, the animal tethering assembly 10 generally comprises an anchor 12 that may be inserted into ground 14. The anchor 12 comprises a screw 16 that has a top end 18 and a bottom end 20. The screw 16 is manipulated thereby facilitating the screw 16 to penetrate ground 14. A cap 22 is coupled to the top end 18 of the screw 16. The cap 22 has an outer surface 24 and the outer surface 24 is threaded.

A leash unit 26 is removably coupled to the anchor 12. The leash unit 26 includes a leash 28 that may be attached to an animal 30 thereby restricting movement of the animal 30. The animal 30 may be a dog or the like. The leash 28 is selectively urged outwardly from the leash unit 26. Moreover, the leash 28 is selectively retracted into the leash unit 26.

The leash unit 26 comprises a first can 32 that has a bottom wall 34 and a peripheral wall 36 extending upwardly therefrom. The peripheral wall 36 has a distal edge 38 with respect to the bottom wall 34 and an inner surface 40. The inner surface 40 is threaded adjacent to the distal edge 38. The bottom wall 34 has an outer surface 42. The bottom wall 34 has a first well 44 extending toward the outer surface 24 of the bottom wall 34.

A collar 46 is coupled to the outer surface 24 of the bottom wall 34. The collar 46 has an inside surface 48 and the inside surface 48 is threaded. The cap 22 threadably engages the inside surface 48 such that the first can 32 is removably coupled to the screw 16. Thus, the first can 32 may be positioned in ground 14 having the distal edge 38 being exposed.

A second can 50 is provided. The second can 50 has a lower wall 52 and an exterior wall 54 extending upwardly therefrom. The exterior wall 54 has an inside surface 56 and the lower wall 52 has an outside surface 58. The second can 50 is removably positioned within the first can 32. A knob 60 is coupled to and extends downwardly from the outside surface 58 of the lower wall 52. The knob 60 engages the first well 44 when the second can 50 is positioned within the first can 32.

A disk 62 is provided that has a top surface 64, a bottom surface 66 and a peripheral edge 68 extending therebetween. The peripheral edge 68 is threaded. The top surface 64 of the disk 62 has a second well 70 extending toward the bottom surface 66. The second well 70 has a lower bounding surface 72. The lower bounding surface 72 has an opening 74 extending through the bottom surface 66 of the disk 62. The peripheral edge 68 threadably engages the inner surface 40 of the first can 32 such that the disk 62 closes the first can 32.

A first rod 76 is coupled to the inside surface 48 of the second can 50. The first rod 76 extends across a center of the second can 50. A second rod 78 is coupled to the inside surface 48 of the second can 50. The second rod 78 is offset from the center of the second can 50. Moreover, the second rod 78 is oriented parallel with the first rod 76. The second rod 78 is positioned between the lower wall 52 and the first rod 76.

A spool 80 is rotatably positioned on the first rod 76. The spool 80 is biased to rotate in a retracting direction. The spool 80 is selectively urged to rotate in a dispensing direction. A pulley 82 is rotatably positioned on the second rod 78.

The leash 28 is wrapped around the spool 80 and the leash 28 has a distal end 84 with respect to the spool 80. The leash 28 extends around the pulley 82 and outwardly through the opening 74 in the second well 70. The distal end 84 of the leash 28 may be coupled to the animal 30. The leash 28 extends outwardly from the opening 74 when the animal 30 moves away from the first can 32. Thus, the leash 28 facilitates the animal 30 to move a selected distance from the first can 32. The spool 80 retracts the leash 28 into the first can 32 when the animal 30 moves toward the first can 32.

A coupler 86 is provided and the coupler 86 is coupled to the distal end 84 of the leash 28. The coupler 86 is coupled to the animal 30. The coupler 86 may engage a collar on the animal 30 or the like. The coupler 86 engages the lower bounding surface 72 of the second well 70 when the spool 80 is urged to rotate in the retracting direction. Thus, the leash 28 is inhibited from being fully retracted into the first can 32.

In use, the anchor 12 is screwed into the ground 14. The first can 32 is threadably coupled to the cap 22. The coupler 86 is urged outwardly from the second well 70 and the coupler 86 is coupled to the animal 30. The leash 28 is drawn outwardly from the leash unit 26 when the animal 30 moves away from the leash unit 26. The leash 28 is retraced into the can when the animal 30 moves toward the can. Thus, the leash 28 is inhibited from getting tangled thereby enhancing the animal 30's mobility and comfort.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An animal tethering assembly being configured to be positioned below ground, said assembly comprising:
   an anchor being configured to be inserted into ground; and
   a leash unit being removably coupled to said anchor, said leash unit including a leash being configured to be attached to an animal thereby restricting movement of the animal, said leash being selectively urged outwardly from said leash unit, said leash being selectively retracted into said leash unit; wherein said leash unit comprises a first can having a bottom wall and a peripheral wall extending upwardly therefrom, said peripheral wall having a distal edge with respect to said bottom wall and an inner surface, said bottom wall having an outer surface, said inner surface being threaded adjacent to said distal edge; a second can having a lower wall and an exterior wall extending upwardly therefrom, said exterior wall having an inside surface, said lower wall having an outside surface, said second can being removably positioned within said first can; a first rod being coupled to said inside surface of said exterior wall, said first rod extending across a center of said second can; and a second rod being coupled to said inside surface of said exterior wall, said second rod being offset from said center of said second can, said second rod being oriented parallel with said first rod, said second rod being positioned between said lower wall and said first rod.

2. The assembly according to claim 1, wherein said anchor comprises a screw having a top end and a bottom end, said screw being configured to be manipulated thereby facilitating said screw to penetrate ground.

3. The assembly according to claim 2, further comprising a cap being coupled to said top end, said cap having an outer surface, said outer surface being threaded.

4. The assembly according to claim 3, further comprising a collar being coupled to said outer surface of said bottom wall, said collar having an inside surface, said inside surface being threaded, said cap threadably engaging said inside surface such that said first can is removably coupled to said screw wherein said first can is configured to be positioned in ground having said distal edge being exposed.

5. The assembly according to claim 1, further comprising a disk having a top surface, a bottom surface and a peripheral edge extending therebetween, said peripheral edge being threaded, said top surface of said disk having a well extending toward said bottom surface, said well having a lower bounding surface, said lower bounding surface having an opening extending through said bottom surface of said disk, said peripheral edge threadably engaging said inner surface of said first can such that said disk closes said first can.

6. The assembly according to claim 1, further comprising a spool being rotatably positioned on said first rod, said spool being biased to rotate in a retracting direction, said spool being selectively urged to rotate in a dispensing direction.

7. The assembly according to claim 1, further comprising a pulley being rotatably positioned on said second rod.

8. The assembly according to claim 7, further comprising:
   a disk having a second well, said second well having an opening; and
   said leash being wrapped around said spool, said leash having a distal end with respect to said spool, said leash extending around said pulley and outwardly through said opening in said well, said distal end of said leash being configured to be coupled to the animal, said leash extending outwardly from said opening when the animal moves away from said first can wherein said leash is configured to facilitate the animal to move a selected distance from said first can, said spool retracting said leash into said first can when the animal moves toward said first can.

9. The assembly according to claim 8, further comprising a coupler being coupled to said distal end of said leash, said coupler being configured to be coupled to the animal, said coupler engaging said lower bounding surface of said second well when said spool is urged to rotate in said retracting direction such that said leash is inhibited from being fully retracted into said first can.

10. An animal tethering assembly being configured to be positioned below ground, said assembly comprising:
   an anchor being configured to be inserted into ground, said anchor comprising:
      a screw having a top end and a bottom end, said screw being configured to be manipulated thereby facilitating said screw to penetrate ground, and
      a cap being coupled to said top end, said cap having an outer surface, said outer surface being threaded; and
   a leash unit being removably coupled to said anchor, said leash unit including a leash being configured to be attached to an animal thereby restricting movement of the animal, said leash being selectively urged outwardly from said leash unit, said leash being selectively retracted into said leash unit, said leash unit comprising:
      a first can having a bottom wall and a peripheral wall extending upwardly therefrom, said peripheral wall having a distal edge with respect to said bottom wall and an inner surface, said bottom wall having an outer surface, said inner surface being threaded adjacent to said distal edge, said bottom wall having a first well extending toward said outer surface of said bottom wall,
      a collar being coupled to said outer surface of said bottom wall, said collar having an inside surface, said inside surface being threaded, said cap threadably engaging said inside surface such that said first can is removably coupled to said screw wherein said first can is configured to be positioned in ground having said distal edge being exposed,
      a second can having a lower wall and an exterior wall extending upwardly therefrom, said exterior wall having an inside surface, said lower wall having an outside surface, said second can being removably positioned within said first can,
      a knob being coupled to and extending downwardly from said outside surface of said lower wall, said knob engaging said first well when said second can is positioned within said first can,
      a disk having a top surface, a bottom surface and a peripheral edge extending therebetween, said peripheral edge being threaded, said top surface of said disk having a second well extending toward said bottom surface, said second well having a lower bounding surface, said lower bounding surface having an opening extending through said bottom surface of said disk, said peripheral edge threadably engaging said inner surface of said first can such that said disk closes said first can,
      a first rod being coupled to said inside surface of said second can, said first rod extending across a center of said second can,
      a second rod being coupled to said inside surface of said second can, said second rod being offset from said center of said second can, said second rod being oriented parallel with said first rod, said second rod being positioned between said lower wall and said first rod,
      a spool being rotatably positioned on said first rod, said spool being biased to rotate in a retracting direction, said spool being selectively urged to rotate in a dispensing direction,
      a pulley being rotatably positioned on said second rod,
      said leash being wrapped around said spool, said leash having a distal end with respect to said spool, said leash extending around said pulley and outwardly through said opening in said well, said distal end of said leash being configured to be coupled to the animal, said leash extending outwardly from said opening when the animal moves away from said first can wherein said leash is configured to facilitate the animal to move a selected distance from said first can, said spool retracting said leash into said first can when the animal moves toward said first can, and
      a coupler being coupled to said distal end of said leash, said coupler being configured to be coupled to the animal, said coupler engaging said lower bounding surface of said second well when said spool is urged to rotate in said retracting direction such that said leash is inhibited from being fully retracted into said first can.

\* \* \* \* \*